United States Patent [19]
Matsuda et al.

[11] Patent Number: 5,281,374
[45] Date of Patent: Jan. 25, 1994

[54] AUTOMATIC PURGING METHOD FOR INJECTION MOLDING MACHINE

[75] Inventors: Kazuo Matsuda, Kyoto; Nobuaki Inaba, Yokohama; Masashi Kaminishi, Osaka; Tetsuji Funabashi, Osaka; Nobukazu Tanaka, Osaka, all of Japan

[73] Assignee: Kabushiki Kaisha Komatsu Seisakusho, Japan

[21] Appl. No.: 334,106

[22] PCT Filed: May 27, 1988

[86] PCT No.: PCT/JP88/00522
§ 371 Date: Jan. 26, 1989
§ 102(e) Date: Jan. 26, 1989

[87] PCT Pub. No.: WO88/09253
PCT Pub. Date: Dec. 1, 1988

[30] Foreign Application Priority Data
May 29, 1987 [JP] Japan ............... 62-136084

[51] Int. Cl.⁵ ............... B29C 45/17; B29C 45/24
[52] U.S. Cl. ............... 264/39; 264/40.1; 264/328.1; 425/225
[58] Field of Search ............... 264/39, 40.1, 40.5, 264/73, 75, 328.1, 349; 425/150, 225, 562, 564, 580, 582, 145

[56] References Cited
U.S. PATENT DOCUMENTS
4,808,355 2/1989 Kamiyama et al. .

FOREIGN PATENT DOCUMENTS
57-57926 4/1982 Japan .
58-158228 9/1983 Japan .
60-175617 9/1985 Japan .
60-193623 10/1985 Japan ............... 264/39
61-54916 3/1986 Japan .
61-74808 4/1986 Japan ............... 264/39
61-135720 6/1986 Japan .

Primary Examiner—Jill L. Heitbrink
Attorney, Agent, or Firm—Ronald P. Kananen

[57] ABSTRACT

An automatic purging method for an injection molding machine which is capable of injecting an arbitrary material among different kinds of materials into a mold without requiring a resin replacing block or a purging container and an additional material supply means for increasing the material supply pressure, and which has a nozzle valve in a nozzle unit. This method is used so as to enable the automatic purging to be done smoothly and speedily by operating the nozzle valve so that it behaves according to a predetermined program. This automatic purging method consists of the steps of supplying a fresh material from a hopper (7) into a screw cylinder (1), rotating a screw with a nozzle valve (4) closed, for a predetermined period of time or until the screw has been moved back a preset stroke, to plasticize the resin, and then purging the molten resin with the nozzle valve (4) set to a predetermined degree of opening.

3 Claims, 1 Drawing Sheet

AUTOMATIC PURGING METHOD FOR INJECTION MOLDING MACHINE

TECHNICAL FIELD OF THE INVENTION

This invention relates to an automatic purging method for an injection molding machine which is applicable when replacement of the material to be injected with another material or replacement of the material to be injected with one having a different color is made, and particularly to an effective automatic purging method for an injection molding machine having a nozzle valve in the nozzle unit thereof.

BACKGROUND ART OF THE INVENTION

In case replacement of the material to be injected with one of a different kind is made while the injection molding machine is in operation, the existing material remaining in a screw cylinder in the molding machine must be purged completely. It is publicly known that this purging is made automatically and a variety of means for effecting such purging have been proposed and carried out effectively. In particular, as for the purging means, it has been recognized effective to apply a high pressure to a resin (material for injection molding) remaining in the screw cylinder, and there are many technical means for automatic purging based on this principle.

For example, the techniques described in publications of Japanese Laid-Open Patent Applications Nos. SHO-57-57926, SHO-58-158228, SHO-59-87136, SHO-59-87137 and SHO-60-175617 require application of additional pressure into a screw cylinder.

However, the prior art examples disclosed in these publications have several points desired to be improved from the viewpoint of mechanism and operation thereof.

Stating in brief, the techniques described in the Japanese Laid-Open Patent Applications Nos. SHO-57-57926, SHO-58-158228 and SHO-59-87136 require troublesome operation of attaching a resin replacing block or a purging container when an automatic purging is made. Further, in the techniques described in Japanese Laid-open Patent Application No. SHO-59-87137, there is a problem in that an arbitrary material among different kinds of materials cannot be injected into the mold because molds having different draft angles and adapted to set different thicknesses of final products need to be used depending on the material to be subjected to injection molding. Further, the techniques described in the Japanese Laid-Open Patent Application No. SHO-60-175617 require provision of a separate material supply means for increasing the material supply pressure with the result that the apparatus per se becomes complicated and increases in the equipment cost and in the number of manufacturing processes are unavoidable.

SUMMARY OF THE INVENTION

The present invention has been made in view of the above-mentioned circumstances, and has for its object to provide an automatic purging method for an injection molding machine which is capable of injecting an arbitrary material among different kinds of materials into a mold without having to provide a resin replacing block or a purging container and a separate material supply means for increasing the material supply pressure, and which has a nozzle valve in the nozzle unit thereof.

Another object of the present invention is to provide an automatic purging method for an injection molding machine having a nozzle valve in the nozzle unit thereof which is capable of effecting automatic purging smoothly and speedily by operating the nozzle valve so that it may behave according to a predetermined program.

To achieve the above-mentioned objects, according to a first aspect of the present invention, there is provided an automatic purging method for an injection molding machine having a nozzle valve adapted to control the flow of the molten resin in the nozzle unit thereof, characterized in that it includes the steps of supplying a fresh material from a hopper accommodating the material into a screw cylinder, rotating a screw with the nozzle valve closed for a predetermined period of time or until the screw has been moved back over a preset stroke so as to plasticize the resin, and then purging the molten resin with the nozzle valve kept at a predetermined degree of opening.

Further, according to a second aspect of the present invention, there is provided an automatic purging method as set forth in above-mentioned first aspect, characterized in that plasticization and purging of the resin are made a predetermined number of times.

Further, according to a third aspect of the present invention, there is provided an automatic purging method as set forth in the above-mentioned second aspect, characterized in that for each time of purging the degree of opening of the nozzle valve during the purging operation is varied and set at a preset value.

Still further, according to a fourth aspect of the present invention, there is provided an automatic purging method as set forth in the above-mentioned second aspect, characterized in that plasticization and purging of the resin are made repeatedly the above-mentioned predetermined number of times for a predetermined period of time.

Furthermore, according to a fifth aspect of the present invention, there is provided an automatic purging method as set forth in the above-mentioned first aspect, characterized in that the degree of opening of the above-mentioned nozzle valve is varied in predetermined multi-stages during one time of purging operation made by the screw.

Further, according to a sixth aspect of the present invention, there is provided an automatic purging method as set forth in the above-mentioned first aspect, characterized in that the degree of opening of the above-mentioned nozzle valve is varied during the purging operation and set at a preset value for each time of purging and is also varied in predetermined multistages even during one time of purging operation made by the screw.

The above-mentioned and other advantages, aspects and objects of the present invention will become apparent to those skilled in the art by refering to the following description and accompanying drawing in which a preferred embodiment in compliance with the principles of the present invention is shown.

DETAILED DESCRIPTION OF PREFERRED EMBODIMENT

Figure 1:
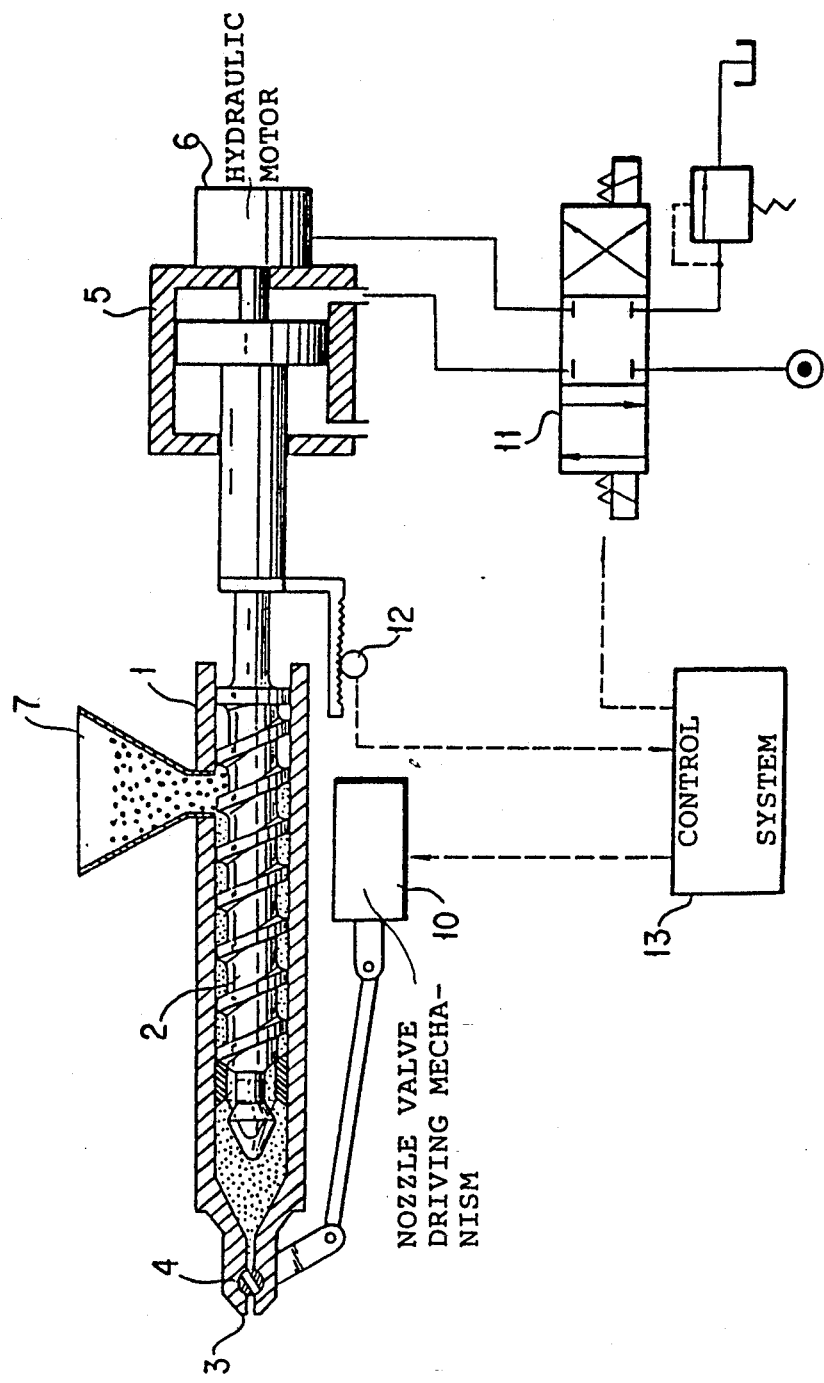
FIG. 1 is a schematic, configurational explanatory view showing one embodiment of injection molding machine having a nozzle valve in the nozzle unit thereof for carrying out the automatic purging method according to the present invention.

The method of the present invention will now be described below by way of example.

FIG. 1 shows one example of injection molding machine having a nozzle valve to which the method of the present invention is applied. This molding machine has a hopper 7 containing a supply of a material to be subjected to injection molding, and a screw cylinder 1 which has a nozzle 3 formed in the leading end thereof and in which a screw 2 is mounted so that it may be rotated and moved forwards and backwards freely. The nozzle 3 has a nozzle valve 4 mounted therein and which is adapted to be opened and closed by means of a nozzle valve driving mechanism 10. The screw 2 has a non-return valve in the vicinity of the leading end thereof to prevent the return or reverse flow of a molten resin. The base or trailing portion of the screw 2 passes through an injection cylinder 5 by way of a piston, and further is connected through a spline to a hydraulic motor 6. Reference numeral 13 denotes a control system adapted to control a directional control valve 11, which connects selectively a pressurized fluid supply source and a back-pressure relief valve with the injection cylinder 5 and the hydraulic motor 6, and the above-mentioned nozzle valve driving mechanism 10. The value detected by a screw position detector 12 is input as a signal to the control system 13.

The control system 13 is adapted to control the operation of the injection molding machine. The control system 13 includes a timer, a comparator and an operational setting console mounted therein.

The nozzle valve 4 is a valve for regulating the degree of opening of the nozzle 3, and the degree of opening of the nozzle is regulated by the nozzle valve driving mechanism 10.

The directional control valve 11 serves to change the purging (injection of molten resin) over to the rotation of the screw 2 and vice versa.

The functions of these component parts are compiled in a program which is input to the control system 13, and automatic purging is made by controlling the directional control valve 11 and the nozzle valve driving mechanism 10.

Stating in brief, in case replacement of the material for injection molding with a different material is made, the supply of the existing material into the screw cylinder 1 is stopped, and instead a fresh material is thrown into the hopper 7. And then, the screw 2 is rotated with the nozzle valve 4 closed for a predetermined period of time or until the screw has been moved back over a preset stroke to plasticize the resin. After that, the nozzle valve 4 is opened and set at a predetermined degree of opening so as to purge the molten resin.

With repeated plasticization or purging of the resin by the rotation of the screw 2 in this condition, the existing material within the screw cylinder 1 is replaced with a fresh material thereby achieving the purging operation. A variety of pressures can be applied to the molten resin within the screw cylinder 1 by varying the degree of opening of the nozzle valve for each one shot of purging to be made by one stroke of the screw 2 or by varying the degree of opening of the nozzle valve during one stroke of the screw 2 or by using these steps in combination. By so doing, the condition of flow of the molten resin within the screw cylinder 1 can be varied and the scraping effect can be enhanced further. Changes in the degree of opening of the nozzle valve contribute to the replacement of the material remaining in the nozzle valve 4 with a fresh, different material. Further, the stroke of the screw 2 which ensures that the purging is made satisfactorily can be controlled under an optimum condition by detecting the actual position of the screw 2 by means of the screw position detector 12 and inputting the detected valve in the control system 13 where the programmed preset value is compared with the detected value by means of the comparator.

We claim:

1. An automatic purging method for an injection molding machine having a nozzle unit and a nozzle valve mounted in said nozzle unit for controlling flow of a molten resin from said machine characterized in that it includes the steps of : (a) moving a fresh material from a hopper containing a supply of the fresh material into a screw cylinder, (b) rotating a screw with the nozzle valve closed for a predetermined period of time or until the screw has been moved back over a preset stroke so as to plasticize the resin, the plasticization of the resin being made a predetermined number of times, and then (c) purging the molten resin with the nozzle valve set at a predetermined degree of opening, the purging of the resin being made a predetermined number of times where for each time of the purging, the degree of opening of the nozzle valve during the purging operation is varied and set to a preset value.

2. The method claimed in claim 1, wherein said plasticization and purging of the resin are made repeatedly said predetermined number of times for a predetermined period of time.

3. The method claimed in claim 1, wherein the degree of opening of said nozzle valve is varied in predetermined multi-stages during one time of purging operation made by said screw.

* * * * *